United States Patent [19]

Wilcock

[11] Patent Number: 5,150,056

[45] Date of Patent: Sep. 22, 1992

[54] METHOD AND DEVICE FOR LOCATING THE LONGITUDINAL AXIS OF A BRANCH PIPE FROM A MAIN PIPE

[76] Inventor: Norman B. Wilcock, Woodbridge Electronics Ltd., Deben Way, Woodbridge, Suffolk, Great Britain

[21] Appl. No.: 651,229

[22] PCT Filed: Jun. 7, 1990

[86] PCT No.: PCT/GB90/00881

§ 371 Date: Feb. 7, 1991

§ 102(e) Date: Feb. 7, 1991

[87] PCT Pub. No.: WO90/15347

PCT Pub. Date: Dec. 13, 1990

[30] Foreign Application Priority Data

Jun. 8, 1989 [GB] United Kingdom ............... 8913200

[51] Int. Cl.5 .................................... G01B 7/31
[52] U.S. Cl. ............................ 324/326; 324/207.14; 324/207.26; 324/226
[58] Field of Search ................ 324/207.19, 207.20, 324/207.22, 207.26, 219-221, 226, 234, 235, 246, 251, 260, 261, 262, 66, 67, 326, 344-346

[56] References Cited

U.S. PATENT DOCUMENTS

| | | | |
|---|---|---|---|
| 2,521,745 | 9/1950 | Pope | 324/67 |
| 3,027,951 | 4/1962 | Knapp et al. | 324/326 |
| 3,406,766 | 10/1968 | Henderson | 324/346 U X |
| 3,495,626 | 2/1970 | Nagel | 324/67 |
| 3,704,413 | 11/1972 | Blevins | 324/67 |
| 3,878,453 | 4/1975 | Potter et al. | 324/326 |
| 3,906,504 | 9/1975 | Guster et al. | 324/326 |
| 4,205,266 | 5/1980 | Lichtenberg | 324/221 X |
| 4,223,228 | 9/1980 | Kaplan | 324/207.26 X |
| 4,371,836 | 2/1983 | Nickel et al. | 324/207.26 |
| 4,631,477 | 12/1986 | Nickel et al. | 324/207.26 |

FOREIGN PATENT DOCUMENTS

| | | |
|---|---|---|
| 374595 | 5/1984 | Austria . |
| 0215695 | 3/1987 | European Pat. Off. . |
| 0326412 | 8/1989 | European Pat. Off. . |
| 56-126760 | 10/1981 | Japan . |
| 2147080 | 5/1985 | United Kingdom . |

Primary Examiner—Kenneth A. Wieder
Assistant Examiner—Warren S. Edmonds
Attorney, Agent, or Firm—Charles D. Gunter, Jr.

[57] ABSTRACT

A method and device are shown for locating the longitudinal axis of a subterranean branch pipe from a main pipe. A magnetic field emitter is mounted in the branch pipe so that it radiates magnetic lines of force along the branch pipe and into the main pipe. The axis of the branch pipe is located by detecting the primary line of the magnetic flux emitted from the emitter using a location device which is moveable within the main pipe. By locating the axis of the branch pipe, a hole registering with the branch can be cut in a lining within the main pipe from which the branch pipe leads.

13 Claims, 3 Drawing Sheets

METHOD AND DEVICE FOR LOCATING THE LONGITUDINAL AXIS OF A BRANCH PIPE FROM A MAIN PIPE

The present invention relates to a method and device for locating branches in drains, notably to a method and device for locating the axis of the branch so that a hole registering with the branch can be cut in a lining within the main drain from which the branch drain leads.

BACKGROUND TO THE INVENTION

Many drains and sewers (hereinafter generally termed drains) were constructed many years ago and the wall structures are now badly eroded or collapsing. In order to repair such damage, it has been proposed to insert a liner within the drain to provide a new water-impervious wall to the drain. However, the wall of the drain is often not continuous since branch drains debouch into the main drain through an entry port in the wall of the main drain. Where a liner is installed, it is necessary to cut an aperture in the liner wall in register with this entry port to allow the free flow of fluid from the branch drain into the main drain.

It has been proposed to locate the entry points for the branch drains by visual survey of the drain before the liner is installed and then to cut the apertures after the liner has been installed by running a suitable cutting machine along the drain for the required distance. However, since most liners are opaque or metallic, the accurate register of the cutting tool with the actual entry port of the branch cannot be achieved visually and dead reckoning measurement has to suffice.

The branch drain often enters the main drain at an angle so that the axis of the branch is not normal to the axis of the main drain. This further complicates the accurate registry of the cutting tool with the actual entry port of the branch drain.

I have now devised a method and apparatus which reduces the above problems.

SUMMARY OF THE INVENTION

Accordingly, the present invention provides a method for locating the longitudinal axis of a branch pipe from a main pipe, which method comprises mounting a magnetic field emitter in the branch pipe so that it radiates magnetic lines of force along the branch pipe and into the main pipe, and locating the axis of the branch pipe by detecting the primary line of the magnetic flux emitted from the emitter by means of a location device moveable within the main pipe.

The term "primary" is used herein in relation to the lines of flux emitted from the emitter to denote that line which is substantially straight. Typically this line coincides with the axis of the emitter and hence of the branch pipe in which the emitter is mounted.

The magnetic field emitter can be one which emits a pulsed or varying magnetic field, for example one which emits a magnetic field in response to a driving oscillator circuit; or can be one which emits a substantially constant continuous signal, as when a permanent magnet is mounted axially within the branch pipe. Depending upon the type of magnetic field emitter used, it may be desirable to shape the field by the use of suitable shaping means so as to provide a directional magnetic field emission directed axially along the branch pipe.

Depending upon the type of field being emitted, the sensor within the main pipe can be selected from a static coil type detector, a balanced induction loop type detector or a Hall effect sensor.

The method of the invention is of especial use where the main drain has a liner therein and it is desired to locate a cutting tool in register with the entry port of the branch drain so as to cut a suitable aperture in the wall of the lining. Whilst a pulsed or varying magnetic field emitter can be used satisfactorily where a non-metallic lining is used, such emitters are not wholly suitable for use with metallic wall liners or with liners made from a material which significantly attenuates or distorts a pulsed magnetic field. Such liners may so affect the signal emitted from a pulsed signal emitter in the branch pipe that accurate location of the axis of the branch pipe is not possible. I have found that the use of a constant magnetic field emitter can often overcome these problems. The invention therefore also provides a method as defined above for locating the position and axis of a branch pipe from a main pipe having a liner made from a material which significantly attenuates a pulsed magnetic field signal, characterised in that the magnetic field emitter in the branch pipe emits a substantially constant magnetic field, and is preferably a permanent magnet.

The position and orientation of the axis of the branch pipe is located by means of magnetic field sensors which are used to detect the direction of the primary line of magnetic flux emitted from the emitter. I have devised a device which is particularly suited to this operation.

Accordingly, the present invention also provides a device for detecting the direction of the primary line of flux emitted from a magnetic field emitter, which device comprises an array of sensors adapted to detect magnetic flux falling upon them, which array is connected to signal detection and processing means to determine when the flux values detected by individual sensor elements within the array are in balance; the array comprising two or more sensor assemblies each comprising at least three sensor elements arranged in substantially the same plane and equidistant from, and preferably but not necessarily symmetrically about, an axis substantially normal to that plane, the two assemblies being mounted substantially parallel to one another and with their axes substantially co-incident; the array being mounted on a transport means adapted to transport the array axially within a duct, the array being provided with means whereby the position and orientation of the axis of symmetry of the array with respect to the axis of the duct can be varied.

Preferably, the two assemblies are mounted so that the sensor elements in the two assemblies are in axial register with one another. It is also preferred that the array is mounted by means which enable the array to be moved in all three dimensions and to be rotated about the longitudinal axis of the duct in which the device is to travel. Typically, the mounting will incorporate electric servo motors to achieve the desired movement of the array and these are linked to a remote control system interlinked with a computerised visual display derived from the sensor signals such that an operator can be provided with a visual display of the movement of the array with respect to the axis of the branch pipe as represented by the direction of the primary line of the flux. The display can also incorporate a diagrammatic display of two cross-sections of the branch pipe which align when the array is positioned accurately on the axis of the pipe.

As stated above, the invention is of especial application in the location of branch pipe entry ports in drains which have been fitted with a liner so that the appropriate aperture can be cut in the liner wall. It is therefore preferred that the device of the invention also incorporate a cutting means which can be actuated by remote control. Preferably, the cutting means comprises a rotary cutting blade, hot wire cutter or water or air jet cutter (optionally with an abrasive medium), which acts axially through the array and is guided by means of the visual display by an operator.

DESCRIPTION OF THE DRAWINGS

To aid understanding of the method and device of the invention, a preferred form of the device and its operation will be described by way of illustration with respect to the accompanying drawings, in which.

DESCRIPTION OF THE PREFERRED EMBODIMENT

Figure 1:
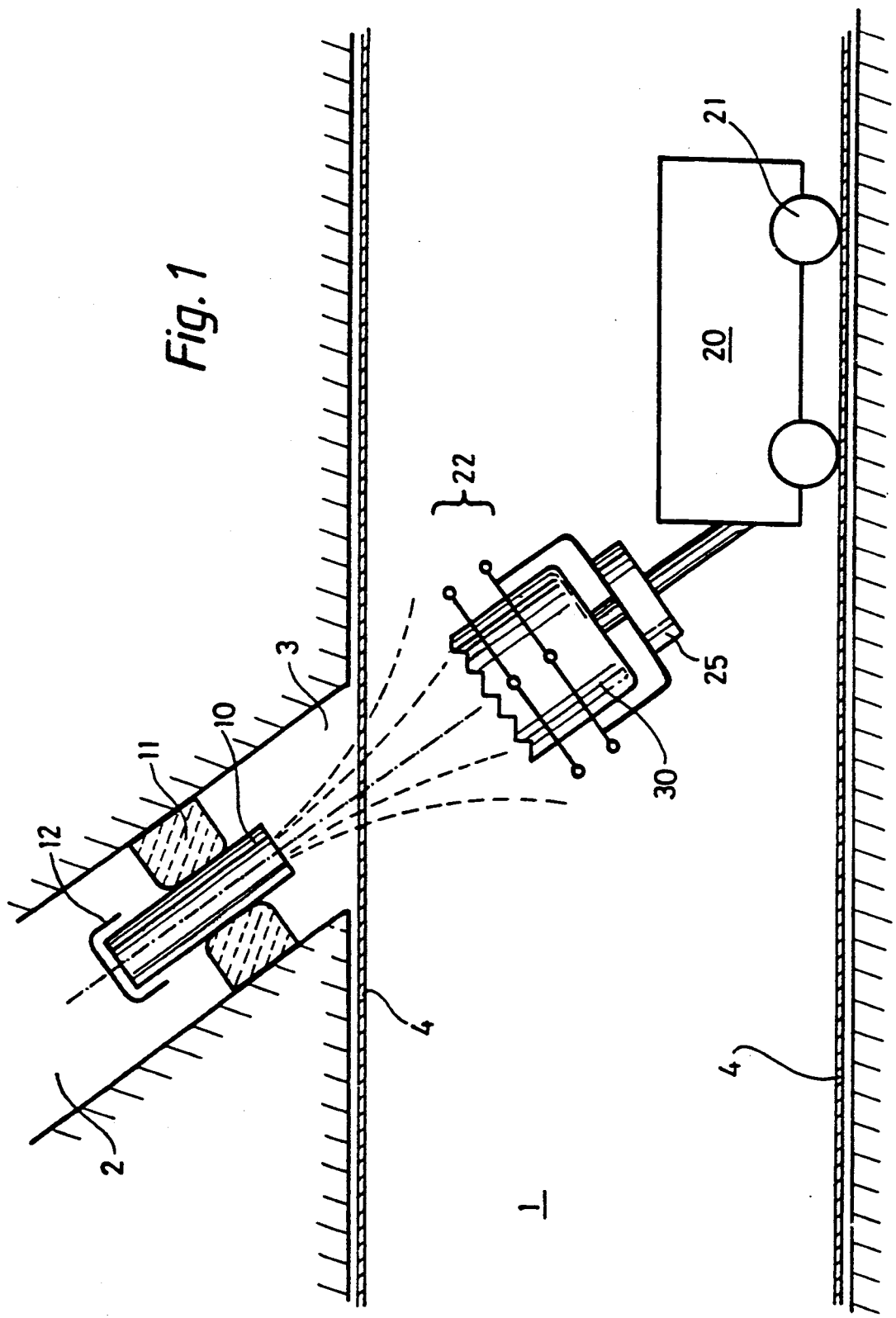
FIG. 1 is a diagrammatic axial cross-section through a drain and a side branch showing the device in position and with a magnetic flux emitter located in the branch pipe.

A drain 1 has a branch drain 2 debouching into it via an entry port 3 in the wall of the drain 1. The entry port 3 can be of any suitable type, for example a swept junction between two concrete drain pipes of different sizes. The drain 1 is fitted with a liner 4. This can be, for example, a close fitting thick walled polyalkylene or other plastic lining pipe, a thin walled liner which has been inflated within the drain pipe and secured against the wall of the drain by a suitable adhesive, optionally with an intermediate concrete infill. However, as indicted above, the permanent magnet aspect of the invention is of especial benefit where the lining is made from stainless steel or other metal which severely attenuates a magnetic signal. For convenience, the invention will be described hereinafter in terms of a stainless steel liner which could be of any thickness due to its transparency to such a field, but which is typically 0.5 to 5 mms thick.

Within the bore of the branch drain 2 is located a magnetic field emitter 10. This can be a pulsed or variable strength magnetic field transmitter where the liner 4 is not a metal one. Such magnetic field transmitters are available commercially from Woodbridge Electronics Limited under the trade mark MagMarka. However, it is preferred to use a permanent magnet as the magnetic field emitter. This can be of any suitable form which emits flux axially along the bore of the pipe 2. Typically, the emitter 10 will be a bar magnet aligned substantially co-axially with the longitudinal axis of the pipe. The magnet will produce a field strength at the centre of the main pipe 1 which can be readily detected by the sensing device. Preferably, the magnetic field is as strong as possible. The appropriate magnet for use in any given case can be readily determined by simple calculation having regard to the geometry of the pipe system in which it is to be used and the sensitivity of the array used to locate it.

The magnet 10 can be secured in position within the pipe 2 by any suitable means. Preferably the mounting means are such as to allow the flow of fluid past the emitter when mounted in the pipe. Thus, the magnet 10 can be fitted with an inflatable collar or a foamed plastic collar 11 or the like which expands against the wall of the pipe 2 and holds the magnet in position by friction. Alternatively, the magnet can be provided with radially expanding springs, rubber fingers, or the like which engage the wall of the pipe but leave clear passages through which fluid can flow past the magnet.

The magnet 10 is located within pipe 2 at such a point that its magnetic field can be detected within the main pipe 1 by the array of the locating device. Typically, the magnet will be located with its poles directed axially along the bore of pipe 2 and within 2 to 100 cms of the entry port.

The magnet 10 can be provided with means, for example magnetic sleeves or end plates 12, which shape the field emitted by the magnet so as to direct it more axially along the pipe than is the case with an unshaped field. The optimum form of the magnet and its shaping pieces can be readily determined for each situation, as is known in the art.

The device for locating the axis of the branch pipe 2 typically comprises a remotely controlled carriage 20 having caterpillar tracks, wheels or other means 21 by which it can be propelled axially along the main drain bore. Many suitable forms of such carriages are known and available commercially. Preferably, the carriage is electrically or hydraulically powered and controlled from a control system located above ground by the operator via suitable connecting cables or by radio or other suitable linkage.

Figure 2:
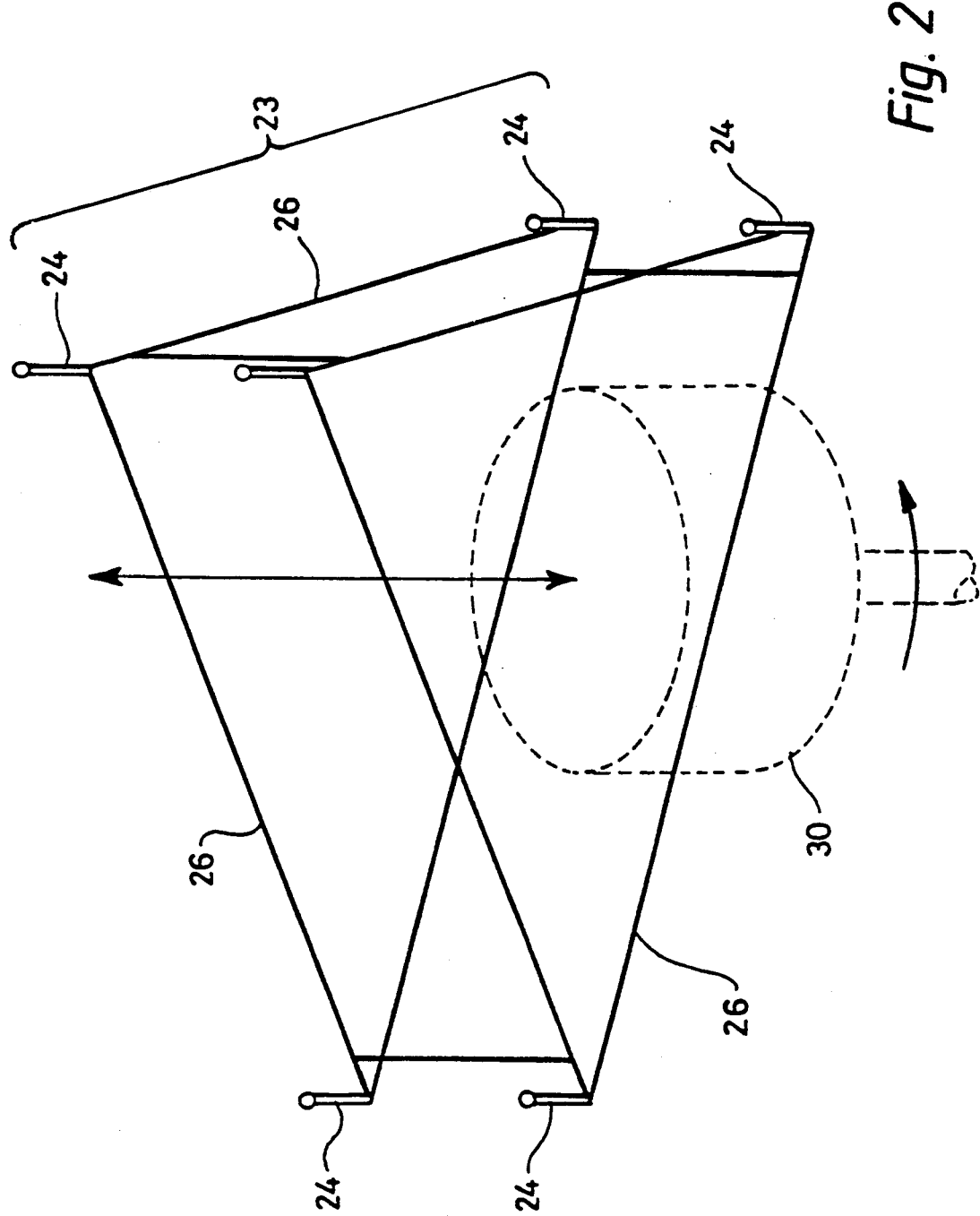
FIG. 2 is a diagrammatic exploded view of the array used in the device.

The carriage 20 carries the array 22 used to detect the magnetic flux from magnet 10. This array, as shown in FIG. 2, comprises two parallel and substantially identical assemblies 23 of sensor elements 24 carried on a mounting 25 which allows the array to be moved in all three planes and to be rotated about the longitudinal axis of the pipe 1. Many suitable forms of such mounting can be devised and constructed using conventional engineering techniques. However, it is preferred that the array be moveable by means of electric or hydraulic motors which are controlled by the operator from the above ground control system, for example by means of joy-sticks or the like, which can be interlinked with a computerised display so that the operator can readily determine the movement of the array.

Figure 3:
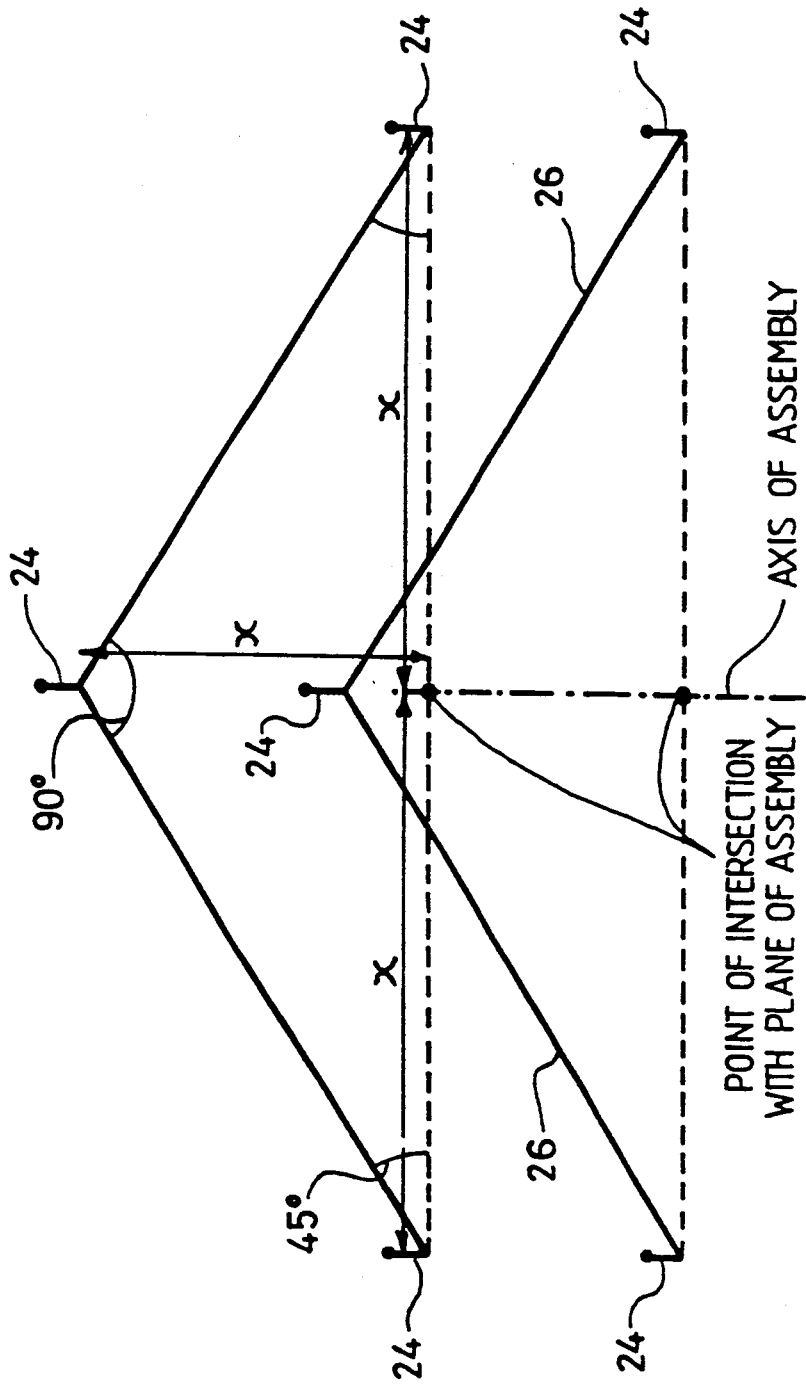
FIG. 3 shows an alternative array to that of FIG. 2.

The array 22 comprises two or more substantially parallel assemblies 23 of sensor elements 24. The assemblies are in the form of planar units carrying the sensor elements substantially equidistant about an axis transverse to the unit. The units can be in the form of flat support plates with the sensor elements mounted on one face thereof. Preferably, the units take the form of an open frame, for example a triangular frame with a sensor element mounted at each apex of the triangle. As indicated above, the sensor elements can be located symmetrically about the axis, as when the sensors are located at the apexes of an equilateral triangle as shown in FIG. 2. However, in the case where three sensors are used, they need not be arranged symmetrically about the axis, provided that they are equidistant from the axis, as shown in FIG. 3. It is also within the scope of the present invention to use assemblies which comprise combinations of sensor elements or groupings of sensor elements which give a balanced signal when placed in the path of the primary line of magnetic flux. For example each assembly could comprise 3 sensors each a distance X from the axis and 3 other sensors a distance Y from the axis. The term equidistant is therefore used herein to denote that the sensors in each group are located so that their response to the primary line of flux will be substantially balanced with the response from the other sensors in that group.

In order that the array should be capable of detecting when it is aligned with the lines of magnetic flux in which it is positioned, at least two of the planar units described above are used with the units being mounted parallel to one another and with their axes of symmetry substantially co-axial, preferably substantially co-incident. It is preferred that the two planar units be substantially identical and that the sensor elements on the two units be aligned with one another.

The function of the sensor elements is to detect the flux from the magnet 10 and any suitable sensor elements may be used. Thus, the elements 24 can be simple coil detectors where a pulsed or varying field transmitter is used, a magnetometer type of detector when a permanent magnet is used, or more preferably a Hall effect sensor which will detect permanent magnet and pulsed field emitters. For convenience, the invention will be described hereinafter in terms of a simple Hall effect sensor of the type which is available commercially.

A typical array for present use comprises two assemblies each have three Hall effect sensors located at the apexes of preferably non-metallic triangular rod frames 26. The optimum separation between the sensors in an assembly will depend, inter alia, upon the shaping of the magnetic field being sensed and the distance between the emitter and the sensing device. The optimum configuration of the array and the sensor elements for use therein can be readily determined by trial and error for any given case.

The output from the sensor elements can be fed to the control system where they are processed by a conventional microprocessor or the like to give a visual display of the projected position of the axis based upon the out of balance signals from the sensors. The imbalance of the signals reduces as the array is aligned more accurately to the primary line of flux and hence the axis of the branch pipe. Such processing can be readily achieved using conventional computer techniques.

The carriage 20 also carries a cutter which is to cut the aperture in the wall of the lining once the longitudinal axis of the bore of the branch drain 2 has been located It is preferred that the cutter should operate axially through the array so that its movement is aligned to the orientation of the array and the cutter operates along the primary line of flux detected by the array. Thus, as shown dotted in FIG. 2, a rotary cutter 30 can be reciprocated by any suitable means through the centre of the triangular frames supporting the sensor elements along the axis of symmetry of the array. The cutter can be of any suitable form and can be driven by a drive motor carried by the carrier 20 under the control of the operator from the control system above ground.

The device of the invention can be provided with other features to enhance its utility, for example a television camera so that the operation of the device can be monitored visually as well as through the computer display.

In operation, the device of the invention is caused to travel along the main drain 1 until the sensor elements detect a magnetic field from a magnet in a branch drain 2. The position of the carriage and the orientation of the array are adjusted by the operator until the output from all pairs of sensors in a group in each assembly are balanced. Hence the array is aligned with the axis of the bore of the branch drain. During this operation, the computerised display will assist the operator in aligning the array correctly.

When the array is correctly aligned, the cutter 30 is actuated to cut the desired aperture in the wall of the lining 4.

The above operation readily lends itself to full computer controlled operation so that the location of the entry ports 3 for the branch drains 2 and the cutting of the apertures in register therewith can be carried out automatically.

I claim:

1. A method for locating the longitudinal axis of a branch pipe from a main pipe, which method comprises mounting a magnetic field emitter in the branch pipe so that it radiates magnetic lines of force generally axially along the branch pipe and into the main pipe, and locating the axis of the branch pipe by detecting the primary line of the magnetic flux emitted from the emitter by means of a location device moveable within the main pipe.

2. A method as claimed in claim 1 wherein the main pipe has a liner and the position of the branch pipe is located through the liner and the liner is cut away to expose the branch pipe after the latter has been located.

3. A method as claimed in any one of the preceeding claims wherein the magnetic field emitter emits a pulsed magnetic field and this is sensed by a coil or loop type detector located in the main pipe.

4. A method as claimed in either of claims 1 or 2 wherein the main pipe has a liner made from a material which significantly attenuates a pulsed magnetic field and the emitter emits a substantially constant magnetic field.

5. A method for locating the longitudinal axis of a branch pipe from a main pipe, which method comprises mounting a magnetic field emitter in the branch pipe so that it radiates magnetic lines of force generally axially along the branch pipe and into the main pipe, and locating the axis of the branch pipe by detecting the primary line of the magnetic flux emitted from the emitter by means of a location device moveable within the main pipe, wherein the magnetic flux from the emitter is detected by a device comprising an array of sensors adapted to detect magnetic flux falling upon them, which array is connected to signal detection and processing means adapted to determine when the flux values detected by individual sensor elements within the array are in balance and thereby to detect when the array is aligned to the primary line of flux of the magnetic signal from the emitter; the array comprising at least two sensor assemblies, each assembly comprising at least three sensor elements arranged in substantially the same plane and so located about an axis substantially normal to that plane that their response to the primary line of flux of the magnetic field will be substantially balanced by the response from other elements in that assembly, the two assemblies being mounted substantially parallel to one another and with the said axes substantially coincident with one another; the array being mounted on a travelling carriage including means for transporting the array axially along the longitudinal axis of the duct, the array being provided with means whereby the position and orientation of the said axes of the assemblies with respect to the longitudinal axis of he duct can be varied.

6. A method as claimed in claim 5 wherein each assembly comprises three or more sensor elements which have substantially the same response to magnetic flux and which are arranged substantially symmetrically about an axis of symmetry common to the array.

7. A device for use in detecting the primary line of flux emitted from a magnetic field emitter, which device comprises:

sensor means including an array of sensors for detecting magnetic flux falling upon said sensors;

signal detection and processing means connected to said array for determining when the flux values detected by individual sensor elements within the array are in balance and thereby to detect when the array is aligned to the primary line of flux of the magnetic signal from the emitter;

the array comprising at least two sensor assemblies, each assembly comprising at least three sensor elements arranged in substantially the same plane and so located about an axis substantially normal to that plane that the response of an element to the primary line of flux of the magnetic field passing along that axis will be substantially balanced by the response from the other elements in that assembly, the two assemblies being mounted substantially parallel to one another and with the said axes substantially coincident with one another;

the array being mounted on a travelling carriage including means for transporting the array axially along the longitudinal axis of the duct, the array being provided with means whereby the position and orientation of the said axes of the assemblies with respect to the longitudinal axis of the duct can be varied.

8. A device as claimed in claim 7 wherein the sensor elements in each assembly have substantially the same response to magnetic flux and are located symmetrically and equidistantly about a common axis of symmetry of the array.

9. A device as claim in claim 8 wherein the assemblies are mounted so that the sensor elements in one assembly are in axial register with the sensor elements in another assembly.

10. A device as claimed in claim 7 wherein the array is mounted by means which enable the array to be moved in all three dimensions and to be rotated about the longitudinal axis of the duct in which the device is to travel.

11. A device as claimed in claim 7 wherein the sensor elements are Hall effect sensors.

12. A device as claimed in claim 7, wherein the device carries means for cutting a liner within a duct within which the device travels.

13. A device as claimed in claim 12 wherein the assemblies comprise generally equilateral triangular frames carrying the sensor elements at or adjacent the apexes thereof and the cutter means operates along the axis of symmetry of the array through the spaces within the frames.

* * * * *